US009366328B2

(12) United States Patent
Yoshino et al.

(10) Patent No.: US 9,366,328 B2
(45) Date of Patent: Jun. 14, 2016

(54) POWER TRANSMISSION UNIT FOR VEHICLE

(75) Inventors: Hirotsugu Yoshino, Susono (JP);
Daisuke Kobayashi, Mishima (JP);
Michio Yoshida, Susono (JP); Tomoe Osada, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 61 days.

(21) Appl. No.: 14/402,768

(22) PCT Filed: May 23, 2012

(86) PCT No.: PCT/JP2012/063177
§ 371 (c)(1),
(2), (4) Date: Nov. 21, 2014

(87) PCT Pub. No.: WO2013/175585
PCT Pub. Date: Nov. 28, 2013

(65) Prior Publication Data
US 2015/0087452 A1 Mar. 26, 2015

(51) Int. Cl.
F16H 37/02 (2006.01)
F16H 37/06 (2006.01)

(52) U.S. Cl.
CPC ........ *F16H 37/021* (2013.01); *F16H 2037/026* (2013.01)

(58) Field of Classification Search
CPC .......... F16H 2702/06; F16H 2037/023; F16H 2037/0873; F16H 2037/0886
USPC .......................... 74/664, 665 R; 475/210, 213
See application file for complete search history.

(56) References Cited

U.S. PATENT DOCUMENTS 4,530,256 A * 7/1985 Hattori .................. B60W 10/02
192/48.618
5,690,576 A * 11/1997 Moroto ............... F16H 37/0846
475/211

(Continued)

FOREIGN PATENT DOCUMENTS

JP 56-090155 7/1981
JP 2000-130548 5/2000

(Continued)

OTHER PUBLICATIONS

International Search Report Issued Aug. 21, 2012 in PCT/JP12/063177 Filed May 23, 2012.
Written Opinion of the International Searching Authority issued Aug. 21, 2012 in PCT/JP12/063177 Filed May 23, 2012 (with English translation).

*Primary Examiner* — Ha D Ho
(74) *Attorney, Agent, or Firm* — Oblon, McClelland, Maier & Neustadt, L.L.P

(57) ABSTRACT

A power transmission unit for a vehicle is provided. In the power transmission unit, a continuously variable transmission to alter a speed ratio continuously is disposed between an input shaft to which a torque of a prime mover is inputted and an output shaft rotated by the torque transmitted from the input shaft. A first gear train that transmits the torque to propel the vehicle in the forward direction is arranged parallel to a second gear train that transmits the torque to propelling the vehicle backwardly. The power transmission unit is comprised of: a first clutch device that selectively allows a torque transmitting route from the input shaft to the output shaft via the first gear train to transmit the torque therethrough; a dog clutch that switches the torque transmitting route from the input shaft to the output shaft between a continuously variable speed change route in which the torque is transmitted through the continuously variable transmission and a reverse route in which the torque is transmitted through the second gear train; and a second clutch device that connects and disconnects both of the continuously variable speed change route and the reverse route to/from at least any one of the input shaft and the output shaft.

11 Claims, 9 Drawing Sheets

(56) References Cited

U.S. PATENT DOCUMENTS

| | | | | |
|---|---|---|---|---|
| 5,720,686 | A | * | 2/1998 | Yan ............... F16H 37/021 475/211 |
| 5,904,633 | A | * | 5/1999 | Lee ............... F16H 37/021 475/210 |
| 8,105,192 | B2 | * | 1/2012 | Simon ............ F16H 37/021 474/74 |
| 8,123,646 | B2 | * | 2/2012 | Triller ............ F16H 37/021 475/211 |
| 8,915,811 | B2 | * | 12/2014 | Horiike ........... F16H 37/021 474/8 |
| 2004/0106488 | A1 | | 6/2004 | Sato et al. |
| 2012/0209495 | A1 | * | 8/2012 | Sakai ............. B60K 6/485 701/102 |

FOREIGN PATENT DOCUMENTS

| | | |
|---|---|---|
| JP | 2004-76876 | 3/2004 |
| JP | 2005-308041 | 11/2005 |

\* cited by examiner

|  | C1 | C2 | Dog Clutch |
|---|---|---|---|
| Starting Vehicle | ON | OFF | R→ F |
| Forward | OFF | ON | F |
| Backward | OFF | ON | R |

POWER TRANSMISSION UNIT FOR VEHICLE

TECHNICAL FIELD

The present invention relates generally to a transmission unit for transmitting power of a prime mover of an automobile, and more particularly, to a power transmission unit comprising a transmission route including a continuously variable transmission, and another transmission route arranged parallel to said transmission route.

BACKGROUND ART

Generally, an output torque of an internal combustion engine is increased with an increase in a rotational speed, but a vehicle requires a large drive force at low speed and small drive force at high speed. That is, the vehicle required opposite torque characteristic to that generated by the engine. In addition, optimum operating points of the engine are limited. Therefore, the vehicle having the engine as a prime mover is provided with a transmission to alter a speed ratio according to need so that the engine is allowed to be operated at the optimum operating points to generate drive force by altering the speed ratio of the transmission based on a running condition such as a vehicle speed, an accelerator opening etc. However, if a geared transmission adapted to shift a gear stage stepwise is used in the vehicle, the engine cannot be always operated at optimum operating points. That is, if the optimum operating speed exists between the gear stages, the operating efficiency of the engine would be worsened. In order to avoid such disadvantage, a continuously variable transmission has been used in place of the geared transmission.

A belt-driven continuously variable transmission and a toroidal continuously variable transmission are commonly used in vehicles. The belt driven continuously variable transmission is comprised of a belt for transmitting power a pair of pulleys and a belt running on those pulleys to transmit power therebetween. A speed ratio of between those pulleys is altered continuously by changing a groove width of the pulleys to vary a running radius of the belt. In turn, the toroidal continuously variable transmission is comprised of a pair of discs being opposed to each other, and a power roller interposed between those discs. Rotational speeds of those discs are differentiated depending on an inclination of a line connecting contact points between the power roller and each discs with respect to a rotational center of the power roller. That is, speed difference between the disc, i.e., a speed ratio is changed from "1" with an increment in the inclined angle (or tilting angle) of the power roller.

The continuously variable transmission of those kinds are adapted to transmit torque utilizing a friction between the pulley and the belt or a friction between the disc and the power roller so that a speed ratio thereof can be altered continuously. Since the friction is a product of a friction coefficient and a vertical load (or a loading in a normal direction) at the contact points of two members, the larger vertical load is required with an increase in the torque to be transmitted. Specifically, in the belt driven continuously variable transmission of vehicle the vertical load is a load of the pulley to clamp the belt. To this end, the required load is established by delivering hydraulic fluid to a hydraulic actuator integrated with the pulley.

A large drive force is required to launch the vehicle, but a required drive force to cruise the vehicle is smaller than that to launch the vehicle. That is, the larger vertical load is required to establish the friction to launch the vehicle. Specifically, in the belt-driven continuously variable transmission, higher hydraulic pressure to clamp the belt is required when launching the vehicle. In order to launch the vehicle promptly, an additional hydraulic device for establishing larger hydraulic pressure is required. Consequently, the larger drive system and the hydraulic system will be enlarged by such additional hydraulic device. In addition, fuel economy will be worsened as a result of establishing high pressure.

Japanese Patent Laid-Opens Nos. 2000-130548, 2004-076876, 2005-308041 describe systems for dealing with the foregoing disadvantages. Japanese Patent Laid-Open No. 2000-130548 describes a system for a vehicle comprised of a gear train connected to an input shaft through a first clutch, and a continuously variable transmission connected to the input shaft through a second clutch. The gear train is configured to establish forward speed stages and a reverse speed stage. A torque is transmitted from a drive gear disposed on an input shaft to a first countershaft, and further transmitted from the first countershaft selectively to a forward gear train and reverse gear train.

A driven gear meshing with the drive gear and a reverse drive gear are fitted onto the first countershaft. An output drive gear and a reverse driven gear are arranged coaxially while being allowed to rotate. A dog clutch is individually disposed between the first countershaft and the output drive gear, and between the output drive gear and the reverse driven gear. The first countershaft is connected to the output drive gear through the dog clutch, or the reverse driven gear is connected to the output drive gear through the dog clutch. A first idle gear is fitted onto a first idler shaft to be meshed with the reverse driven gear disposed on the first countershaft. A second idle gear is disposed on the idler shaft to be meshed with the first idle gear. A third idle gear is disposed on the second idler shaft to be meshed with the reverse driven gear.

The output drive gear is meshed with an output driven gear fitted onto an output shaft while being allowed to rotate. A one-way clutch and a third clutch juxtaposed in parallel each other are disposed between the output drive gear and an output shaft. A secondary pulley of driven side is fitted onto the output shaft of the belt driven continuously variable transmission, and a primary pulley of drive side is fitted onto the input shaft. Those primary and secondary pulleys are connected through a belt running thereon. The input shaft and the primary pulley are connected through the second clutch.

According to the Japanese Patent Laid-Open No. 2000-130548, the vehicle is launched in forward direction by engaging the first clutch while connecting the first countershaft to the output drive gear through the dog clutch thereby transmitting torque from the input shaft to the output shaft through the gear train. By contrast, the torque is transmitted from the input shaft to the reverse driven gear and the output drive gear through the first countershaft, the first idler shaft, and the second idler shaft, by engaging the first clutch while connecting the reverse driven gear to the output drive gear through the dog clutch. Consequently, the output shat is rotated in a direction opposite to the direction to propel the vehicle in the forward direction, that is, a reverse stage is established. In addition, the torque is transmitted from the input shaft to output shaft trough the belt-driven continuously variable transmission by engaging the second clutch instead of the first clutch to propel the vehicle in a forward direction while alerting a speed ratio continuously.

Japanese Patent Laid-Open No. 2004-076876 describes a power transmission device in which a torque reversing device comprised of a single pinion planetary gear unit is disposed between an input shaft transmitting power from an engine and a primary pulley of a belt-driven continuously variable transmission. A ring gear of the torque reversing device is connected with the primary pulley to be rotated therewith, and a sun gear is connected with an input shaft. Therefore, a forward stage is achieves by connecting the sun gear with the ring gear by a clutch, and a reverse stage is achieved by fixing a carrier by a brake. In addition, a gear train adapted to establish a speed ratio a larger than a maximum speed ratio of a continuously variable transmission is formed between the input shaft and the output shaft integrated with a secondary pulley. An input gear of the gear train is integrated with the input shaft, and an output gear connected with the input shaft through an idle gear is fitted onto the output shaft while being allowed to rotate. In addition, a one-way clutch and a friction clutch are arranged in series between the output gear and the output shaft.

Accordingly, when launching the vehicle in the forward direction, the clutch for connecting the input shaft with the primary pulley is disengaged while engaging the clutch of the output shaft side, thereby transmitting torque to the output shaft from the input shaft through the gear train, the one-way clutch, and the clutch arranged in series therewith. The maximum speed ratio of the continuously variable transmission is slightly smaller than that of the gear train. In this situation, therefore, the secondary pulley and the output shaft integrated therewith are rotated at a speed higher than the previous speed and a rotational speed of output gear so that the one-way clutch is brought into disengagement. Consequently, the torque is transmitted to the output shaft through the continuously variable transmission. Since the gear train thus transmits the torque when launching the vehicle, a large torque is not applied to the continuously variable transmission when launching the vehicle.

According to the teachings of Japanese Patent Laid-Open No. 2005-308041, an engine power is applied to a sun gear of a single-pinion planetary gear unit serving as a torque reversing device, and the sun gear is connected to an input shaft integrated with a primary pulley of a belt-driven continuously variable transmission through a clutch. An input gear is fitted onto the input shaft through a one-way clutch, and the input gear is connected with a ring gear of torque reversing device. The one-way clutch is adapted to be engaged when the input shaft rotates in a forward direction at higher speed than the input gear situated at the outer circumferential side. An output gear is fitted onto an output shaft integrated with a secondary pulley through another one-way clutch, and an idle gear is disposed between the output gear and the input gear while being meshed therewith. That is, the input gear and the output gear are rotated together in the same direction. A gear ratio (or speed ratio) between the input gear and the output gear is slightly smaller than the maximum speed ratio of the continuously variable transmission comprised of those pulleys and the belt wrapped around those pulleys. Said another one-way clutch is adapted to be engaged when the output shaft rotates in the forward direction at higher speed than the output gear. In addition, a friction clutch is arranged in parallel with said one-way clutch. Further, a brake to fix a carrier of the torque reversing device is arranged to drive the vehicle in the backward direction.

Thus, in the power transmission device taught by Japanese Patent Laid-Open No. 2005-308041, the vehicle is launched in the forward direction by connecting the sun gear with the input shaft by the clutch to transmit the torque to main speed change route comprised of the continuously variable transmission the through the input shaft, and by engaging the one-way clutch to further transmit the torque to a sub speed change route. In this situation, since the speed ratio of the gear train is slightly smaller than the maximum speed ratio of the continuously variable transmission, the output gear rotates at higher speed than the output shaft. Consequently, the one-way clutch at the output shaft side is brought into disengagement so that the torque is transmitted to the drive wheels through the gear train. Therefore, the large torque will not be applied to the continuously variable transmission when launching the vehicle. After launching the vehicle, the speed ratio of the continuously variable transmission is gradually reduced with an increase in the vehicle speed so that a rotational speed of the output shaft integrated with the secondary pulley is raised to that of the output gear situated outer circumferential side of the output shaft, and then further raised with a decrease in the speed ratio. As a result, the one-way clutch of output shaft side is brought into engagement so that the torque is transmitted to the drive wheels through the continuously variable transmission. In this situation, the one-way clutch of the input shaft side is in disengagement, therefore an interlock will not occur.

In any of the teachings of those prior art documents, the gear train is arranged in parallel with the belt-driven continuously variable transmission, and the torque for propelling the vehicle is transmitted through the gear train. Especially, according to Japanese Patent Laid-Open No. 2000-130548, the torque applied to the gear train is selectively transmitted through the dog clutch to the gear train for launching the vehicle and to the gear train for propelling the vehicle in the backward direction. To this end, in the continuously variable transmission taught by Japanese Patent Laid-Open No. 2000-130548 a total of four engagement elements is required such as the first clutch, the second clutch, the dog clutch, and the one-way clutch. In addition, the third clutch arranged in parallel with the one-way clutch is also required. According to the teachings of Japanese Patent Laid-Open No. 2000-130548, therefore, the torque can be transmitted to launch the vehicle and to propel the vehicle in the backward direction without using the belt-driven continuously variable transmission. However, large number of engagement elements is required to establish such torque transmission route. Therefore, the structure of the transmission is complicated and dimension thereof is enlarged.

As described, according to the teachings of Japanese Patent Laid-Open No. 2000-130548, the torque transmission route for propelling the vehicle in the forward direction and the torque transmission route for propelling the vehicle in the backward direction are switched by the dog clutch. Therefore, a shifting delay may occur during the so-called garage shifting. That is, the dog clutch is switched without applying the torque thereto. According to the teachings of Japanese Patent Laid-Open No. 2000-130548, therefore, a torque transmission to the dog clutch has to be cut off by disengaging the first clutch, and in this situation, the dog clutch is switched and then the first clutch is engaged. Therefore, it takes time to wait the torque applied to the dog clutch disappears, and the first clutch is engaged after conforming a fact that the dog clutch is switched. Thus, according to the teachings of Japanese Patent Laid-Open No. 2000-130548, the switching operation of the dog clutch and the engaging operation of the first clutch may be delayed inevitably to deteriorate shifting response during the garage shifting.

According to the teachings of Japanese Patent Laid-Open No. 2004-076876, the torque reversing mechanism establishes reverse stage when propelling the vehicle in the backward direction. The torque transmitted through the torque reversing mechanism is transmitted to the belt-driven continuously variable transmission, and the torque is further transmitted to the drive wheels. According to the teachings of Japanese Patent Laid-Open No. 2004-076876, therefore, the speed ratio under the reverse stage may be restricted to the ratio possible to be achieved by the continuously variable transmission.

The power transmission device taught by Japanese Patent Laid-Open No. 2005-308041 is adapted to reduce the torque applied to the belt-driven continuously variable transmission when propelling the vehicle in the forward direction. Therefore, the speed ratio of the gear train transmitting the torque when launching the vehicle is smaller than the maximum speed ratio that is possible to be achieved by the continuously variable transmission. For this reason, a total range of the speed ratio cannot be widened.

DISCLOSURE OF THE INVENTION

The present invention has been conceived noting the foregoing technical problem, and it is therefore an object of the present invention is to provide a power transmission unit for a vehicle in which a torque transmission route can be selected from a plurality of transmission routes, and to simplify a structure of the power transmission unit while improving a speed change response.

The present invention is applied to a power transmission unit for a vehicle comprised of: a continuously variable transmission that is adapted to alter a speed ratio continuously, and that is disposed between an input shaft to which a torque of a prime mover is inputted and an output shaft that outputs the torque; a first gear train that transmits the torque when propelling the vehicle in the forward direction; and a second gear train that transmits the torque when propelling the vehicle in the backward direction and that is arranged parallel to the first gear train. In order to achieve the above-explained objectives, the power transmission unit is provided with: a first clutch device that selectively allows a torque transmitting route from the input shaft to the output shaft via the first gear train to transmit the torque therethrough; a dog clutch that switches the torque transmitting route from the input shaft to the output shaft between a continuously variable speed change route in which the torque is transmitted through the continuously variable transmission and a reverse route in which the torque is transmitted through the second gear train; a second clutch device that selectively enables and disables both of the continuously variable speed change route and the reverse route to transmit the torque to the input shaft or the output shaft; and a counter gear pair that is disposed at a site to transmit the torque of the input shaft to the continuously variable transmission route and to the reverse route, and that is involved in a torque transmission between the input shaft and the continuously variable transmission route and a torque transmission between the input shaft and the reverse route.

The first gear train is adapted to establish a speed ratio larger than a maximum speed ratio of the continuously variable transmission or a speed ratio smaller than a minimum speed ratio of the continuously variable transmission using a plurality of gears.

A movable member of the dog clutch is engaged with an input member for the continuously variable speed change route and the reverse route, or with an output member for the reverse route. The dog clutch thus structured is adapted to enable a torque transmission through the continuously variable speed change route by engaging the movable member with a member forming a part of the continuously variable speed change route, and to enable a torque transmission through the reverse route by engaging the movable member with a member forming a part of the reverse route.

The first clutch device and the second clutch device are individually formed by a single clutch.

Specifically, the first clutch device and the second clutch device may be individually formed by a fiction clutch.

For example, the dog clutch may be disposed at a site to transmit the torque to the output shaft while switching the torque transmission route between the continuously variable speed change route and the reverse route. In this case, the counter gear pair is allowed to use the drive gear arranged coaxially with the input shaft commonly to transmit torque between the input shaft and the continuously variable speed change route, and to transmit torque between the input shaft and the reverse route.

The first clutch device is disposed between the input shaft and the first gear train, and the first gear train is connected to the output shaft.

Alternatively, the first clutch device disposed between the output shaft and the first gear train may also be connected to the input shaft.

The second clutch device may be disposed at a site to transmit the torque of the input shaft to the continuously variable speed change route and to the reverse route.

Alternatively, the second clutch device may also disposed at a site to transmit the torque from the continuously variable speed change route and the reverse route to the output shaft.

The dog clutch may also be disposed at a site to transmit the torque of the input shaft selectively to the continuously variable speed change route and to the reverse route.

According to the present invention, the torque transmission route from the input shaft to the output shaft is selected from the route passing through the first gear train, the route passing through the second gear train, and the route passing through the continuously variable transmission. In order to switch the torque transmission route, only three engagement devices such as the first clutch device, the second clutch device and the dog clutch are employed. Thus, according to the present invention, the torque transmission route can be selected from multiple options but number of the required engagement devices is rather small. Therefore, a structure of the power transmission unit can be simplified so that the power transmission unit can be downsized. According to the present invention, especially, the route for transmitting torque through the continuously variable transmission and the route for transmitting torque through the second gear train to propel the vehicle backwardly can be switched by the common dog clutch. Therefore, the structure of the power transmission unit can be simplified so that the power transmission unit can be downsized.

According to the present invention, the first gear train is adapted to establish a speed ratio larger than the maximum speed ratio of the continuously variable transmission or a speed ratio smaller than the minimum speed ratio of the continuously variable transmission. Therefore, a possible range of the speed ratio of the power transmission unit can be widened.

As described, according to the present invention, each clutch device is individually formed of a single clutch. Therefore, the power transmission unit can be further downsized. For example, a friction clutch may be used as the clutch device. In this case, the torque transmission route may be switched from the route through the first gear train to the route through the continuously variable transmission or to the route through the second gear train by the clutch-to-clutch shifting while causing a slip of each friction clutch transitionally to switch the clutch to transmit the torque. For this reason, a control response of the shifting operation such as a garage shifting can be improved. In addition, shift shocks can be reduced.

In case of arranging the dog clutch in the output side, the drive gear may be used commonly in the gear pair for transmitting torque from the input shaft to the continuously variable speed change route, and in the gear pair for transmitting torque from the input shaft to the reverse route. In other words, the counter gear pair or the gear train of the continuously variable speed change route and the counter gear pair or the gear train of the reverse route are allowed to share the common gear. Therefore, the structure of the power transmission unit can be further simplified so that the power transmission unit can be further downsized.

Given that the clutch device and the dog clutch are arranged on the input side, that is, at a site possible to transmit the torque from the input shaft, the torque multiplied by a speed reduction will not be applied to the clutch devices and the dog clutch. Therefore, the clutch devices can be downsized and the torque capacity thereof can be reduced.

By contrast, if the clutch device and the dog clutch are arranged on the output side, that is, at a site possible to transmit the torque to the output shaft, a speed difference between an input side and an output side of the clutch device or the dog clutch can be reduced so that the slip of the clutch device or the dog clutch can be reduced to improve durability thereof. In addition, the input speed and the output speed of the dog clutch can be synchronized easily so that the dog clutch can be engaged or disengaged smoothly. Therefore, the dog clutch that does not have a synchronizing member can be used instead of a synchronizer having a synchronizing function so that the cost of the power transmission unit can be reduced.

BEST MODE FOR CARRYING OUT THE INVENTION

According to the present invention, there is provided a power transmission unit for transmitting a power of a prime mover such as an engine and a motor, and the power transmission unit has a speed change function. In general, this kind of power transmission unit is called a transmission or a transaxle. More specifically, the present invention is applied to a power transmission unit in which a continuously variable transmission and a gear train of predetermined speed ratio (or a gear ratio) are arranged parallel to each other between an input shaft and an output shaft. In the power transmission unit, a conventional belt-driven continuously variable transmission and a toroidal continuously variable transmission may be used. Specifically, the belt-driven continuously variable transmission is suitable for a power transmission unit of an FF layout vehicle (i.e., a front engine/front wheel drive vehicle), and the toroidal continuously variable transmission is suitable for a power transmission unit of an FR layout vehicle (i.e., a front engine/rear wheel drive vehicle).

The gear train is formed to transmit a torque from an input shaft to an output shaft, and adapted to establish a speed ratio which cannot be established by the continuously variable transmission according to need. To this end, the gear train is formed by meshing a plurality of gears, and a gear ratio (i.e., a ratio between numbers of tooth) thereof is adjusted to establish a speed ratio larger than a maximum speed ratio of the continuously variable transmission or a speed ratio smaller than a minimum speed ratio of the continuously variable transmission. In order to prevent the continuously variable transmission from being subjected to a large torque for launching the vehicle, it is preferable to form the gear train in a manner to establish a speed ratio larger than a maximum speed ratio of the continuously variable transmission. By contrast, in order to improve a fuel economy by lowering a speed of a prime mover, it is preferable to form the gear train in a manner to establish a speed ratio smaller than a minimum speed ratio of the continuously variable transmission.

Figure 1:
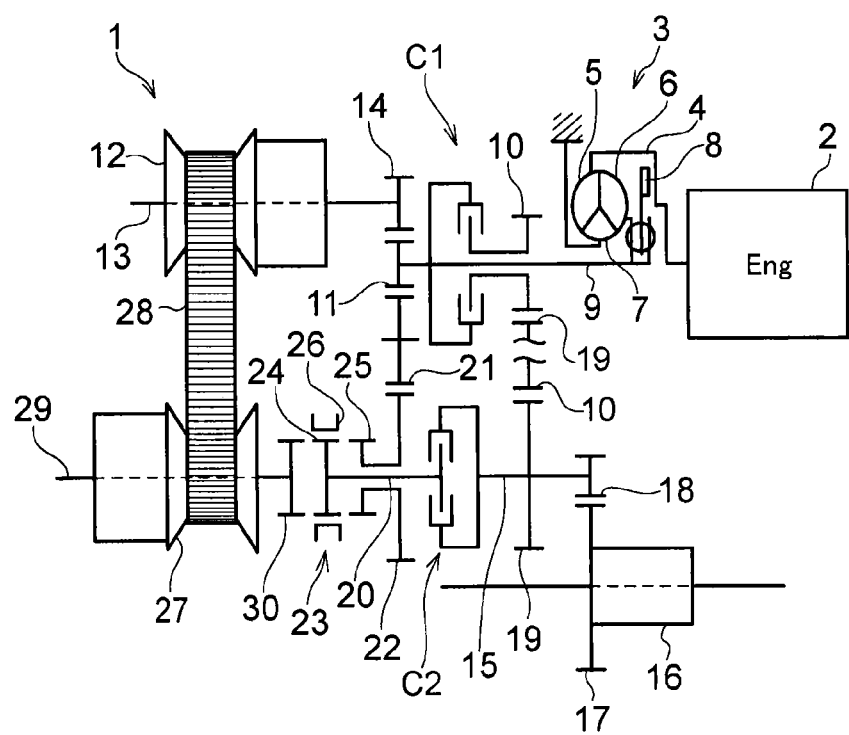
FIG. 1 is a skeleton diagram showing a first example of the power transmission unit for a vehicle according to the present invention.

Referring now to FIG. 1, there is shown a first example of the power transmission unit adapted for the FF layout vehicle. Accordingly, a belt-driven continuously variable transmission is employed as a continuously variable transmission 1, and an internal combustion engine such as a gasoline engine is employed as a prime mover (as will be called the "engine" hereinafter, and abbreviated as "Eng" in the drawings) 2.

A conventional torque converter 3 having a lockup clutch 8 is connected to an output shaft (i.e., a crank shaft) of the engine 2. The torque converter 3 is comprised of a pump impeller 5 integrated with a front cover 4, a turbine runner 6 being opposed to the pump impeller 5, and a stator 7 that is held through a not shown one-way clutch and that is interposed between the pump impeller 5 and the turbine runner 6. The lockup clutch 8 is arranged to be opposed to an inner face of the front cover 4 in a manner to be rotated together with the turbine runner 6. Therefore, the lockup clutch 8 is engaged with the inner face of the front cover 4 to transmit torque therebetween depending on a difference between pressures on both sides of the lockup clutch 8. Such torque transmission between the lockup clutch 8 and the front cover 4 is interrupted by disengaging the lockup clutch 8 from the inner face of the front cover 4. The turbine runner 6 is connected to an input shaft 9.

A drive gear 10 for launching the vehicle is fitted onto the input shaft 9 while being allowed to rotate, and a first clutch device C1 is arranged coaxially with the input shaft 9 to selectively connect the drive gear 10 with the input shaft 9. In order to thus connect the drive gear 10 with the input shaft 9, a friction clutch, a dog clutch or a one-way clutch may be used as the first clutch device C1. According to the first example shown in FIG. 1, any of a multiple plate type and a single plate type, and a dry type or wet type friction clutch may be employed as the first clutch device C1 so as to simplify a structure of the power transmission unit and to carry out an after-explained clutch-to-clutch shifting. A reverse drive gear 11 is also fitted onto the input shaft 9 in a manner to be rotated integrally therewith. Thus, according to the first example shown in FIG. 1, the foregoing elements are arranged in order of the torque converter 2, the first clutch device C1, and the reverse drive gear 11.

A primary pulley (i.e., a drive pulley) of the continuously variable transmission 12 is radially offset from the input shaft 9. A counter driven gear 14 meshing with the reverse drive gear 11 is fitted onto the primary shaft 13 rotated integrally with the primary pulley 12. Therefore, the primary shaft 13 is rotated in the direction opposite to the rotational direction of the input shaft 9.

In order to deliver the torque to a front differential 16 as a final reduction gear unit, an output shaft 15 is arranged parallel to the input shaft 9. To this end, an output gear 18 meshing with a ring gear 17 of the front differential 16 is fitted onto the output shaft 15 in a manner to be rotated integrally therewith. In addition, a driven gear 19 for launching the vehicle meshing with the drive gear 10 is also fitted onto the output shaft 15 in a manner to be rotated integrally therewith. That is, the torque is delivered from the input shaft 9 to the output shaft 15 through the first clutch device C1, the drive gear 10 and the driven gear 19. Thus, the drive gear 10 and the driven gear 19 form the first gear train of the invention serving as a starting transmission mechanism for launching the vehicle in the forward direction. Specifically, a gear ratio (or a speed ratio) between the drive gear 10 and the driven gear 19 is adjusted to establish a speed ratio (of the low speed side) larger than a maximum available speed ratio (i.e., a speed ratio of the lowest speed side) of the continuously variable transmission 1.

An intermediate shaft 20 is arranged coaxially with the output shaft 15, and a second clutch device C2 is disposed between the output shaft 15 and the intermediate shaft 20, that is, at a site to transmit a torque to the output shaft 15. In order to selectively connect the output shaft 15 and the intermediate shaft 20, as the first clutch device C1, a friction clutch, a dog clutch, or a one-way clutch may be used as the second clutch device C2. According to the first example shown in FIG. 1, any of a multiple plate type and a single plate type, and a dry type and wet type friction clutches may be used as the second clutch device C2 so as to simplify a structure of the power transmission unit and to carry out an after-explained clutch-to-clutch shifting.

A reverse transmission mechanism is interposed between the intermediate shaft 20 and the input shaft 9. The above-explained starting transmission mechanism formed by the drive gear 10 and the driven gear 19 is adapted to transmit the torque in a manner to rotate the output shaft 15 in an opposite direction to a rotational direction of the input shaft 9 when transmitting the torque from the input shaft 9 to the output shaft 15. By contrast, the reverse transmission mechanism is adapted to transmit the torque in a manner to rotate the intermediate shaft 20 in the same direction as the rotational direction of the input shaft 9 when transmitting the torque from the input shaft 9 to the intermediate shaft 20. To this end, an idle gear 21 is interposed between the input shaft 9 and the intermediate shaft 20 in a manner to rotate around an axial line parallel to those shafts 9 and 20. Specifically, the idle gear 19 is meshed with the reverse drive gear 11 disposed on the input shaft 9 while being meshed with a reverse driven gear 22 fitted onto the intermediate shaft 20 in a rotatable manner. Accordingly, the reverse drive gear 11, the idle gear 21, and the reverse driven gear 22 serve as the second gear train of the invention, and a route for transmitting the torque to the output shaft 15 through the reverse gear 11, the idle gear 21 and the reverse driven gear 22 serves as the reverse route of the invention. In addition, the reverse drive gear 11 and the idle gear 21 form the counter gear pair of the invention that is involved in a torque transmission between the input shaft 9 and the reverse route.

Figures 2, 3:
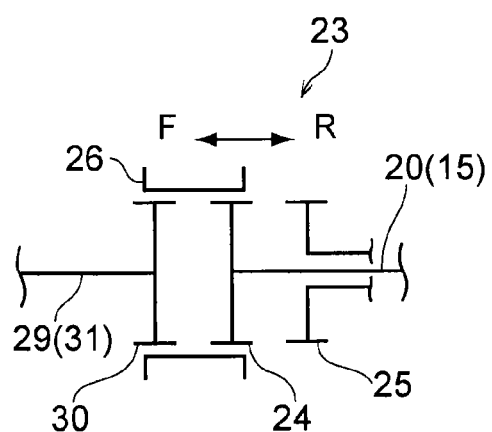
FIG. 2 is a skeleton diagram showing a structure of a dog clutch.
FIG. 3 is a table showing engagement states of the first clutch device, the second clutch device and the dog clutch.

A dog clutch 23 is arranged to selectively connect and disconnect the reverse driven gear 22 to/from the intermediate shaft 20. The dog clutch 23 is adapted to be brought into engagement and disengagement but is not adapted to be brought into partial engagement while causing a slip. For example, a clutch engaged through a spline may be used as the dog clutch 23, and an example thereof is schematically shown in FIG. 2. As shown in FIG. 2, a hub 24 is formed on the intermediate shaft 20 and a hub 25 is formed on the reverse driven gear 22, and a spline is formed individually on an outer surface of each hub 24, 25. Those hubs 24 and 25 are arranged close to each other, and a sleeve 26 is splined onto those hubs 24 and 25 while being allowed to reciprocate in an axial direction. Therefore, the intermediate shaft 20 is disconnected from the reverse driven gear 22 by moving the sleeve 26 to a position where the sleeve 26 is disengaged from any of the hubs 24 and 25. By contrast, the intermediate shaft 20 is connected with the reverse driven gear 22 to transmit the torque therebetween by moving the sleeve 26 to a position where the sleeve 26 is engaged with both hubs 24 and 25. To this end, a not shown actuator is employed to reciprocate the sleeve 26 in the axial direction.

As known in the prior art, the continuously variable transmission 1 is comprised of the primary pulley 12 as a drive member, a secondary pulley 27 as a driven member, and a belt 28 running on those pulleys 12 and 27. Accordingly, a speed ratio of the continuously variable transmission 1 can be changed continuously by widening or narrowing groove widths of the pulleys 12 and 27 thereby altering running radii of the belt 28.

As described, the primary pulley 12 is radially offset from the input shaft 9. In addition, the primary shaft 13 integrated with the primary pulley 12 is connected to the input shaft 9 to transmit power thereto through the reverse drive gear 11 fitted onto the input shaft 9, and the counter driven gear 14 fitted onto the primary shaft 13 while being meshed with the reverse drive gear 11. Accordingly, the reverse drive gear 11 and the counter driven gear 14 form the counter gear pair of the invention that is involved in a torque transmission between the input shaft 9 and the continuously variable transmission route.

On the other hand, the secondary pulley 27 is disposed in a manner to rotate around a rotational axis parallel to a rotational axis of the primary pulley 12, and provided with a secondary shaft 29 extending along with the rotational axis thereof. Specifically, the secondary shaft 29 extends coaxially with the output shaft 15 and the intermediate shaft 20.

A hub 30 similar to the above-mentioned hubs 24 and 25 of the dog clutch 23 is formed on a leading end of the secondary shaft 29 to be opposed to the intermediate shaft 20. Therefore, the secondary shaft 29 is connected selectively with the intermediate shaft 20 by the above-explained dog clutch 23. Specifically, the secondary shaft 29 is connected with the intermediate shaft 20 to transmit the torque therebetween by moving the sleeve 26 to a position where the sleeve 26 is engaged with both hub 24 of the intermediate shaft 20 and the hub 30 of the secondary shaft 29. By contrast, the secondary shaft 29 is disconnected from the intermediate shaft 20 by moving the sleeve 26 to a position where the sleeve 26 is disengaged from any of the hubs 24 and 30.

As shown in FIG. 2, the hub 24 of the intermediate shaft 20 is situated in the middle, and the hub 30 of the secondary shaft 29 and the hub 25 of the reverse driven gear 22 are situated on both sides of the hub 24. Therefore, the dog clutch 23 can be brought into a neutral state by moving the sleeve 26 to a position to be engaged only with the hub 24 of the intermediate shaft 20 without being engaged with the hubs 25 and 30.

Thus, a torque transmission route from the input shaft 9 to the hub 30 through the continuously variable transmission 1 serves as the continuously variable transmission route of the invention. In the example shown in FIG. 1, the sleeve 26 serves as the "movable member" of the invention, the hub 24 serves as the "input member" or the "output member" of the invention, the hub 25 serves as the "member forming a part of the reverse route" of the invention, and the hub 30 serves as the "member forming a part of the continuously variable transmission route" of the invention. In the example shown in FIG. 1, accordingly, the dog clutch 23 is disposed at a site possible to transmit the torque from the continuously variable speed change route and the reverse route to the output shaft 15.

A gear ratio between the reverse drive gear 11 and the counter driven gear 14 on the continuously variable speed change route may be set not only to a ratio not to achieve a speed increasing or decreasing action, but also to a ratio to achieve a speed increasing or decreasing action. Given that the gear ratio between the reverse drive gear 11 and the counter driven gear 14 is set to the ratio to achieve a speed increasing or decreasing action, a gear ratio between the drive gear 10 and the driven gear 19 serving as the starting transmission mechanism is set to a ratio larger than a ratio achieved by the gear ratio between the reverse drive gear 11 and the counter driven gear 14 and the maximum speed ratio of the continuously variable transmission 1.

In the power transmission unit of the present invention, when launching the vehicle in any of the forward and the backward direction, torque is transmitted to the output shaft 15 through the starting transmission mechanism or the reverse transmission mechanism arranged parallel to the continuously variable transmission 1. Given that the speed of the vehicle running in the forward direction is increased to a certain extent, the torque is transmitted from the input shaft 9 to the output shaft 15 through the transmission route having the continuously variable transmission 1. For example, if a drive position (or a drive range) is selected by a not shown shifting device, the first clutch device C1 is engaged and the second clutch device C2 is disengaged. In this case, if the vehicle is stopping or running at a speed lower than a predetermined speed, the dog clutch 23 is actuated to establish a reverse stage. Specifically, the sleeve 26 is moved to the right side in FIGS. 1 and 2 to connect the reverse driven gear 22 to the intermediate shaft 20.

The engagement states of the first clutch device C1, the second clutch device C2 and the dog clutch 23 are shown in FIG. 3. In FIG. 3, "ON" represents an engagement of the clutch, and "OFF" represents a disengagement of the clutch. As to the dog clutch 23, "R" represents a position for propelling the vehicle in the backward direction, and "F" represents a position for propelling the vehicle in the forward direction. Here, FIG. 3 shows the states of the clutches under both situations where the drive torque is transmitted through the continuously variable transmission 1, and where the vehicle is propelled in the backward direction.

When launching the vehicle in the forward direction, the torque of the engine 2 is delivered through the input shaft 9 and the first clutch device C1 to the drive gear 10, the reverse drive gear 11, and the primary pulley 12 of the continuously variable transmission 1. In this situation, the torque of the reverse drive gear 11 is transmitted to the intermediate shaft 20 through the idle gear 21, the reverse driven gear 22 and the dog clutch 23. However, since the second clutch device C2 is in disengagement, the torque will not be transmitted from the intermediate shaft 20 to the output shaft 15. Meanwhile, in the continuously variable transmission 1, the torque is also transmitted from the primary pulley 12 to the secondary pulley 27 through the belt 28. However, since the dog clutch 21 establishes the reverse stage so that the continuously variable transmission 1 is disconnected from the intermediate shaft 20, the torque will not be transmitted from the continuously variable transmission 1 to the intermediate shaft 20 and the output shaft 15. Consequently, the torque applied to the input shaft 9 is transmitted from the drive gear 10 to the output shaft 15 through the driven gear 19 meshing with the drive gear 10, and the torque is further transmitted from the output shaft 15 to the differential 16 through the output gear 18.

Accordingly, the speed ratio for launching the vehicle in the forward direction is governed by the gear ratio between the drive gear 10 and the driven gear 19 serving as the starting transmission mechanism. The speed ratio thus achieved is larger than the maximum sped ratio of the continuously variable transmission 1. According to the power transmission unit of the present invention, therefore, the drive force for launching the vehicle can be increased sufficiently. In addition, since the drive force is transmitted without passing through the continuously variable transmission 1, it is not necessary to increase a torque transmitting capacity of the continuously variable transmission 1. That is, it is not necessary to increase a belt clamping pressure so that the power loss will not be increased and durability of the continuously variable transmission will not be deteriorated.

When the vehicle speed is increased to the predetermined speed after launching the vehicle, the drive torque delivered to the input shaft 9 is delivered to the output shaft 15 through the continuously variable transmission 1 instead of the starting transmission mechanism. Such alteration of the torque transmission route is carried out by the following procedures. First of all, the sleeve 26 of the dog clutch 23 is moved leftward in FIGS. 1 and 2 to the position "F" for propelling the vehicle in the forward direction thereby disconnecting the reverse driven gear 22 from the intermediate shaft 20 while connecting the secondary shaft 29 of the continuously variable transmission 1 with the intermediate shaft 20. In this situation, since the second clutch device C2 is in disengagement so that the intermediate shaft 20 is disconnected from the output shaft 15, the torque is not applied to the dog clutch 23. Therefore, the sleeve 26 is allowed to move in the axial direction to be disengaged from the hub 25 of the reverse driven gear 22. In this situation, the secondary pulley 27 of the continuously variable transmission 1 is rotated by the torque transmitted from the engine 2 but the torque is not applied to the intermediate shaft 20 being allowed to rotate freely. Therefore, the sleeve 26 is allowed to move toward the secondary shaft 29 to be engaged with the hub 30.

After thus switching the engagement state of the dog clutch 23, the first clutch device C1 is brought into disengagement and the second clutch device C2 is brought into engagement. In this situation, since the speed ratio established by the starting transmission mechanism is differentiated from the speed ratio established by the continuously variable transmission 1, the engine speed is lowered as a result of thus switching the clutch device engaged to transmit the torque. Therefore, in case of engaging the first clutch device C1 while disengaging the second clutch device C2, those clutch devices C1 and C2 are transitionally caused to slip. Specifically, an engagement pressure of the second clutch device C2 is increased gradually thereby increasing the torque transmitting capacity thereof gradually, while reducing an engagement pressure of the first clutch device C1 thereby reducing the torque transmitting capacity thereof gradually. That is, a conventional clutch-to-clutch shifting is carried out to change the torque of the output shaft 15 smoothly thereby reducing shift shocks and uncomfortable feeling.

In order to propel the vehicle in the backward direction, as shown in FIG. 3, the first clutch device C1 is brought into disengagement, the second clutch device C2 is brought into engagement, and the dog clutch 23 is moved to the position "R" for propelling the vehicle in the backward direction. In this case, therefore, the torque is not transmitted from the input shaft 9 to the drive gear 10, and the starting transmission mechanism do not transmit the drive torque. In addition, since the continuously variable transmission 1 is disconnected from the intermediate shaft 20 and the output shaft 15 by thus moving the dog clutch 23 to the position "R" for establishing the reverse stage, the drive torque will not be transmitted to the output shaft 15 through the continuously variable transmission 1. That is, under the reverse stage, the torque of the input shaft 9 is transmitted to the intermediate shaft 20 through the reverse drive gear 11, the idle gear 21, the reverse driven gear 22 and the dog clutch 23. In this situation, since the second clutch device C2 is in engagement, the drive torque is transmitted from the intermediate shaft 20 to the output shaft 15 and further transmitted to the differential 16 through the output gear 18. Thus, since the reverse transmission mechanism is comprised of the idle gear 21, the input shaft 9 and the output shaft 15 are rotated in the same direction opposite to the rotational direction of the output shaft 15 of the case in which the torque is transmitted through the starting transmission mechanism and the continuously variable transmission 1. Consequently, the vehicle is allowed to be propelled in the backward direction.

The engagement states of the first clutch C1, the second clutch C2 and the dog clutch 23 for the case of launching the vehicle in the forward direction will be compared with the engagement states of the those clutches for the case of propelling the vehicle in the backward direction. In case of launching the vehicle in the forward direction, the dog clutch 23 is allowed to be moved to the position "R" for establishing the reverse stage. That is, only the engagement states of the first clutch device C1 and the second clutch device C2 are different between the case of launching the vehicle in the forward direction and the case of propelling the vehicle in the backward direction. Therefore, the power transmission unit is allowed to carry out the clutch-to-clutch shifting under the garage shifting where the vehicle is propelled in the forward and the backward directions alternately, so as to engage and disengage the first clutch device C1 and the second clutch device C2 alternately. Thus, the shifting operation can be completed without shifting the engagement state of the dog clutch 23 so that the shifting delay can be reduced and the control response can be improved. In addition, in the power transmission unit shown in FIG. 1, only the three engagement devices such as the first clutch device C1, the second clutch device C2 and the dog clutch 23 are involved in the torque transmission and the torque interrupting. Therefore, a structure of the power transmission unit can be simplified so that the power transmission unit can be downsized.

Especially, according to the first example shown in FIG. 1, the torque is transmitted from the first clutch device C1 to the output shaft 15 through the drive gear 10 and the driven gear 19 serving as the starting transmission mechanism. Therefore, the torque before multiplied by the speed reduction is applied to the first clutch device C1. That is, a required torque transmitting capacity of the first clutch device C1 is small so that the first clutch device C1 can be downsized and the durability thereof can be improved. In addition, the second clutch device C2 is arranged coaxially with the output shaft 15. Therefore, when the vehicle speed reaches the predetermined speed and the second clutch device C2 is brought into engagement, the speed ratio of the continuously variable transmission 1 is raised to the maximum ratio so that a difference between an input speed and an output speed of second clutch device C2 is reduced. For this reason, slippage of the second clutch device C2 can be reduced so that the durability thereof can be improved. Such advantage may also be achieved under the garage shifting. That is, a difference between the speed ratio for launching the vehicle and the speed ratio under the reverse stage is rather small. Therefore, even if the second clutch device C2 is engaged and disengaged repeatedly under the garage shifting, transient slip of the second clutch device C2 can be reduced so that the durability thereof can be improved.

In addition, the speed ratios of the starting transmission mechanism and the reverse transmission mechanism are not significantly different from the maximum speed ratio of the continuously variable transmission 1, and the engagement state of the dog clutch 23 arranged coaxially with the output shaft 15 is switched while disengaging the second clutch device C2. Therefore, the dog clutch 23 is allowed to be engaged or disengaged under the condition where a speed difference between the drive side and the driven side thereof is small and the torque applied thereto is small. That is, the rotational speed of the dive side and the rotational speed of the driven side can be synchronized easily with each other by moving the sleeve 26 in the engagement direction. In other words, since the rotational speeds of both sides of the dog clutch 23 can be synchronized easily, an additional dog clutch serving as a synchronizer can be omitted so that the cost of the power transmission unit can be reduced. Further, the dog clutch 21 is used not only to establish the reverse stage by axially moving the sleeve 26 but also to allow the torque transmission through the continuously variable transmission 1. That is, the common dog clutch 23 has two functions for establishing the reverse stage and for carrying out the continuously variable speed change. Therefore, according to the power transmission unit of the present invention, number of parts can be reduced so that the structure thereof can be simplified and the power transmission unit itself can be downsized.

Further, according to the example shown in FIG. 1, the reverse drive gear 21 is meshed not only with the counter driven gear 14 to transmit torque between the input shaft 9 and the primary shaft 13 of the continuously variable transmission 1, but also with the reverse driven gear 22 to transmit torque between the input shaft 9 and the reverse transmission mechanism. That is, the continuously variable transmission route and the reverse transmission route share a common element. Therefore, the structure of the power transmission unit can be further downsized.

Here will be explained a second example of the power transmission unit according to the present invention. As described, the first clutch device C1 is adapted to selectively allow and interrupt the torque transmission through the starting transmission mechanism, the second clutch device C2 is adapted to selectively allow and interrupt the torque transmission through the reverse transmission mechanism, and the dog clutch 23 is adapted to switch the torque transmission route between the route through the continuously variable transmission 1 and the route through the reverse transmission mechanism. An arrangement of the first clutch device C1, the second clutch device C2 and the dog clutch 23 may be altered from that shown in FIG. 1 arbitrarily according to need while maintaining the above-explained functions.

Figure 4:
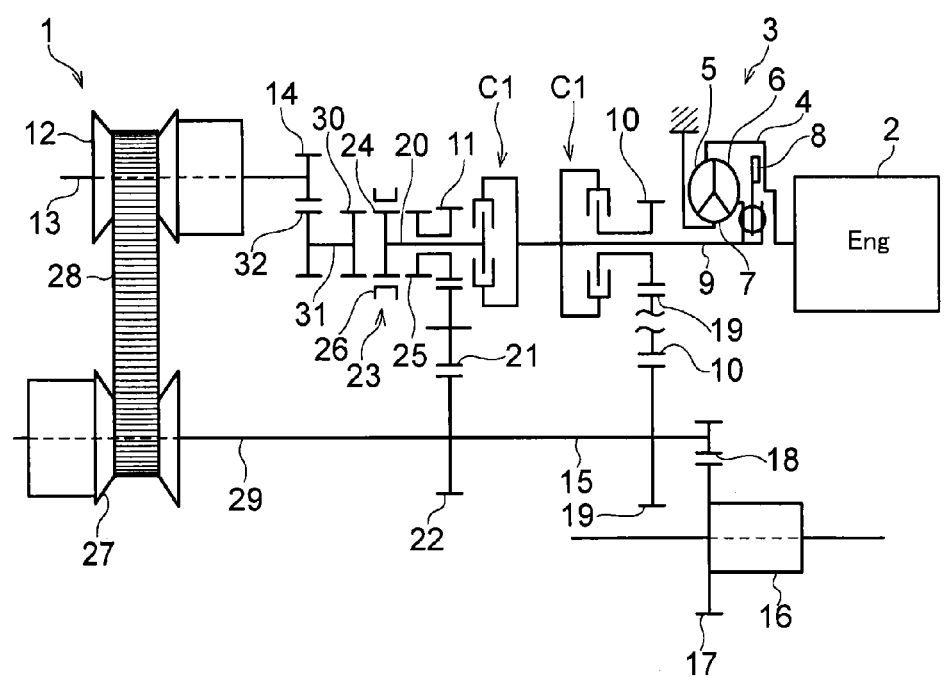
FIG. 4 is a skeleton diagram showing a second example of the power transmission unit for a vehicle according to the present invention.

According to the second example shown in FIG. 4, the second clutch device C2 and the dog clutch 23 are arranged coaxially with the input shaft 9 in addition to the first clutch C1. Specifically, the intermediate shaft 20 and the counter shaft 31 are arranged in order on an extension of the input shaft 9. In order to reverse a direction of the torque transmitted to the continuously variable transmission 1, a counter drive gear 32 is fitted onto the counter shaft 31 to be rotated integrally therewith. The second clutch device C2 is disposed between the input shaft 9 and the intermediate shaft 20, that is, at a site to transmit the torque of the input shaft 9 to the continuously variable transmission route and to the reverse route. Therefore, the input shaft 9 is connected to the intermediate shaft 20 by the second clutch device C2 in case of establishing the speed ratio for propelling the vehicle in the forward direction by the continuously variable transmission 1, and in case of propelling the vehicle in the backward direction.

The reverse drive gear 11 is fitted onto the intermediate shaft 20, and the dog clutch 23 is disposed to selectively connect the intermediate shaft 20 with the reverse drive gear 11 to transmit the torque therebetween. Specifically, the dog clutch 23 is disposed on a leading end of the intermediate shaft 20 (of the counter shaft 31 side), and if the intermediate shaft 20 is disconnected from the reverse drive gear 11, the dog clutch 23 connects the intermediate shaft 20 with the counter shaft 31 to transmit the torque therebetween. The structure of the dog clutch 23 is identical to that shown in FIG. 2. That is, according to the second example shown in FIG. 4, the dog clutch 23 is disposed at a site to transmit the torque of the input shaft 9 to the continuously variable transmission route and to the reverse route. Accordingly, in the second example shown in FIG. 4, the hub 24 serves as the "input member" of the invention.

According to the example shown in FIG. 4, the primary pulley 12 of the continuously variable transmission 1 is radially offset from the counter shaft 31 or the input shaft 9. The counter driven gear 14 is fitted onto the primary shaft 13 rotated integrally with the primary pulley 12, and the counter drive gear 32 meshing with the counter driven gear 14 is fitted onto the counter shaft 31. Therefore, the primary shaft 13 is rotated in the direction opposite to the rotational direction of the input shaft 9.

The secondary pulley 27 of the continuously variable transmission 1 is arranged coaxially with the output shaft 15, and the secondary shaft 29 rotated integrally with the secondary pulley 27 is connected to the output shaft 15 to rotate integrally therewith. In addition, the reverse driven gear 22 and the driven gear 19 of the starting transmission mechanism are fitted onto the secondary shaft 29 or the output shaft 15. The remaining structures are similar to those of the first example shown in FIG. 1. Therefore, common reference numerals are allotted to the common elements in FIG. 4 and detailed explanations for those common elements are omitted.

According to the second example of the power transmission unit shown in FIG. 4, the launching stage for launching the vehicle with the speed ratio larger than the maximum speed ratio of the continuously variable transmission 1, the continuously variable speed change stage using the continuously variable transmission 1, and the reverse stage for transmitting torque through the reverse transmission mechanism can be achieved by engaging and disengaging the first clutch device C1, the second clutch device C2 and the dog clutch 23 as shown in FIG. 3. Specifically, the input shaft 9 is connected to the output shaft 15 through the drive gear 10 and the driven gear 19 serving as the starting transmission mechanism, by engaging the first clutch device C1 while disengaging the second clutch device C2. Consequently, the speed ratio larger than the maximum speed ratio of the continuously variable transmission 1 is established to launch the vehicle by the drive force achieved in accordance with such a large speed ratio. In this situation, even if the sleeve 26 is situated at the position "R" for establishing the reverse stage, the second clutch device C2 is in disengagement so that the torque will not be transmitted to the reverse transmission mechanism from the input shaft 9. Therefore, an interlocking will not occur. Rather, the gear stage can be shifted from the launching stage promptly to the reverse stage by engaging the first clutch device C1 and disengaging the second clutch device C2 while moving the sleeve 26 of the dog clutch 23 to the position "R" for establishing the reverse stage. That is, shifting response under the garage shifting can be improved.

In addition, when launching the vehicle, the gear stage can be shifted promptly from the launching stage where the speed ratio is large to the continuously variable speed change stage where the speed ratio is varied continuously by the continuously variable transmission 1, by carrying out the clutch-to-clutch shifting to disengage the first clutch device C1 and to engage the second clutch device C2, while moving the sleeve 26 of the dog clutch 23 to the position "F" for propelling the vehicle in the forward direction. In this case, the response delay can also be avoided.

The advantages of the first example shown in FIG. 1 may also be achieved by the second example shown in FIG. 4 thus structured. Especially, according to the second example shown in FIG. 4, the second clutch device C2 is disposed on the input shaft 9 side. Therefore, the torque multiplied to be larger than the torque from the input shaft 9 will not be applied to the second clutch device C2. For this reason, the second clutch device C2 can be downsized and the torque capacity thereof can be reduced in comparison with the first example shown in FIG. 1. Likewise, when the vehicle is running, the torque is also applied to the dog clutch 23 from the input shaft 9 without being multiplied by the speed change operation. Therefore, the dog clutch 23 can also be downsized and the torque capacity thereof can also be reduced.

Figure 5:
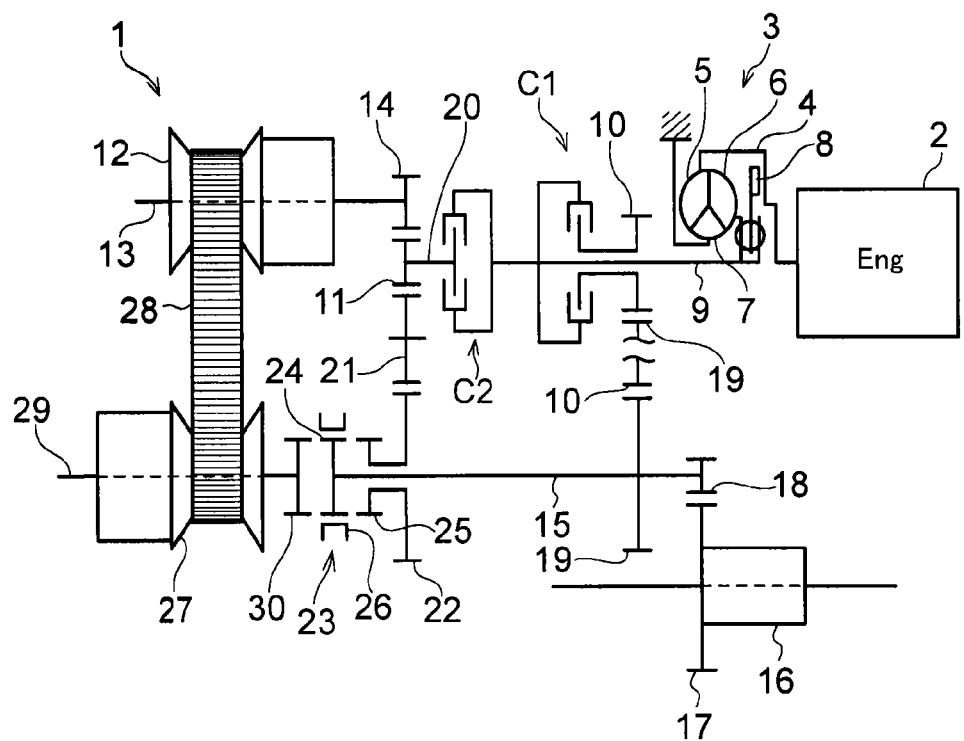
FIG. 5 is a skeleton diagram showing a third example of the power transmission unit for a vehicle according to the present invention.

FIG. 5 shows the third example as a modification of the first example shown in FIG. 1 in which the second clutch device C2 and a counter gear pair are arranged on the input shaft 9 side, and in which other necessary alterations are made. In other words, the third example is a modification of the second example shown in FIG. 4 in which the dog clutch 23 is disposed on the output shaft 15 side, and in which other necessary alterations are made. In the third example, the reverse drive gear 11, the idle gear 21, and the reverse driven gear 22 forming the reverse transmission mechanism are interposed between the second clutch device C2 and the dog clutch 23. Therefore, the counter shaft 25 used in the example shown in FIG. 4 is not arranged in the third example. Specifically, the reverse drive gear 11 is fitted onto the intermediate shaft 20 connected to the input shaft 9 by the second clutch device C2, and the counter driven gear 14 meshing with the reverse drive gear 11 is fitted onto the primary shaft 13 offset from the intermediate shaft 20. That is, according to the third example shown in FIG. 5, the reverse drive gear 11 also serves as the aforementioned counter drive gear 32 to reduce number of gears. In other words, the counter drive gear 32 also serves as the reverse drive gear 11.

The dog clutch 23 is disposed between the secondary shaft 29 and the output shaft 15 arranged coaxially with each other, and the reverse driven gear 22 connected with the reverse drive gear 11 through the idle gear 21 is fitted onto the output shaft 15 while being allowed to rotate. The hub 24 is formed integrally on the output shaft 15, and the hub 30 of the secondary shaft 29 and the hub 25 of the reverse driven gear 22 are situated across the hub 24. The sleeve 26 is splined onto those hubs 24, 25 and 30 while being allowed to move in the axial direction. Therefore, the reverse driven gear 22 or the secondary shaft 29 is selectively connected with the output shaft 15 by moving the sleeve 26 in the axial direction. The remaining structures are similar to those of the example shown in FIG. 4. Therefore, common reference numerals are allotted to the common elements in FIG. 5, and detailed explanations for those common elements are omitted.

According to the third example of the power transmission unit shown in FIG. 5, the launching stage for establishing a large drive force, the continuously variable speed change stage where the drive torque is transmitted through the continuously variable transmission 1, and the reverse stage where the drive torque is transmitted through the reverse transmission mechanism can be achieved by engaging and disengaging the first clutch device C1, the second clutch device C2 and the dog clutch 21 as shown in FIG. 3. Specifically, in case of launching the vehicle in the forward direction, the first clutch device C1 is engaged and the second clutch device C2 is disengaged. Consequently, the input shaft 9 is connected to the output shaft 15 through the drive gear 10, the first clutch device C1 and the driven gear 19 forming the starting transmission mechanism, and the reverse transmission mechanism and the continuously variable transmission 1 are disconnected from the input shaft 9. Therefore, the speed ratio larger than the maximum speed ratio of the continuously variable transmission 1 is established by the starting transmission mechanism to launch the vehicle by the drive force established in accordance with such a large speed ratio. In this situation, the gear stage can be shifted from the launching stage promptly to the reverse stage by disengaging the first clutch device C1 and engaging the second clutch device C2 while moving the sleeve 24 of the dog clutch 21 to the position "R" for establishing the reverse stage. Therefore, the shifting response under the garage shifting can be improved.

In addition, when launching the vehicle, the gear stage can be shifted promptly from the launching stage where the speed ratio is large to the continuously variable speed change stage where the speed ratio is varied continuously by the continuously variable transmission 1, by carrying out the clutch-to-clutch shifting to disengage the first clutch device C1 and to engage the second clutch device C2, while moving the sleeve 26 of the dog clutch 23 to the position "F" for propelling the vehicle in the forward direction. In this case, the response delay can also be avoided.

The advantages of the examples shown in FIGS. 1 and 4 may also be achieved by the third example shown in FIG. 5 thus structured. In addition, according to the third example shown in FIG. 5, number of gears can be reduced. Specifically, as the example shown in FIG. 1, the reverse drive gear 21 is meshed not only with the counter driven gear 14 to transmit torque from the input shaft 9 to the primary shaft 13 of the continuously variable transmission 1 through the intermediate shaft 20, but also with the reverse driven gear 22 to transmit torque from the input shaft 9 to the reverse transmission mechanism through the intermediate shaft 20. Therefore, the structure of the power transmission unit can be simplified so that the power transmission unit can be downsized.

According to the third example shown in FIG. 5, when the engagement state of the sleeve 26 of the dog clutch 23 is switched, that is, when the sleeve 26 is moved axially to be engaged with the hub 30 of the secondary shaft 29 or the hub 25 of the reverse driven gear 22 while being disengaged from the other hub, a speed difference between the output shaft 15 and the secondary shaft 29 or the reverse driven gear 22 can be reduced by increasing the speed ratio of the continuously variable transmission 1 to the ratio close to the maximum ratio. Therefore, as the power transmission unit shown in FIG. 1, the rotational speeds of both sides of the dog clutch 23 can be synchronized easily so that an expensive and complex member such as a synchronizer can be eliminated.

Figure 6:
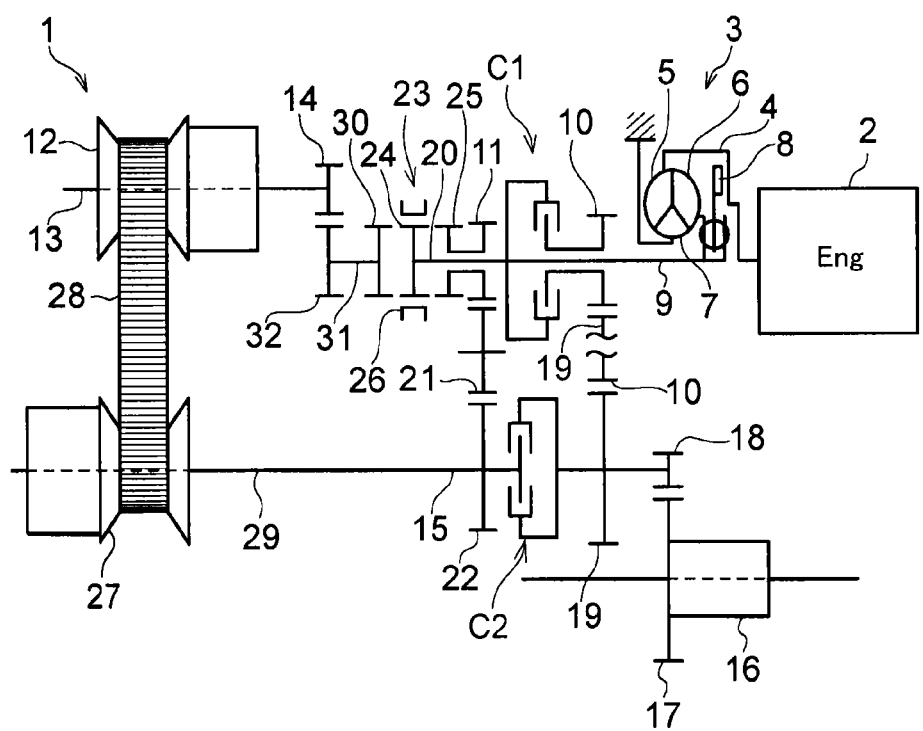
FIG. 6 is a skeleton diagram showing a fourth example of the power transmission unit for a vehicle according to the present invention.

FIG. 6 shows the fourth example as a modification of the first example shown in FIG. 1 in which the dog clutch 23 and the counter gear pair are arranged on the input shaft 9 side, and in which other necessary alterations are made. In other words, the fourth example is a modification of the second example shown in FIG. 4 in which the second clutch device C2 is disposed on the output shaft 15 side, and in which other necessary alterations are made. According to the example shown in FIG. 6, specifically, the reverse drive gear 11 is fitted onto the input shaft 9 while being allowed to rotate, and the reverse driven gear 22 connected with the reverse drive gear 11 through the idle gear 21 is fitted onto the secondary shaft 29 while being allowed to rotate integrally therewith. The output shaft 15 is arranged coaxially with the secondary shaft 29, and the second clutch device C2 is disposed between the secondary shaft 29 and the output shaft 15.

The counter shaft 25 is arranged on an extension of the input shaft 9, and the counter drive gear 32 fitted onto the counter shaft 31 is meshed with the counter driven gear 14 fitted onto the primary shaft 13. The dog clutch 23 is disposed between the input shaft 9 and the counter shaft 31. Specifically, the input shaft 9 is connected with the reverse drive gear 11 by moving the sleeve 26 rightward in FIG. 6 to be engaged with both of the hub 24 of the input shaft 9 and the hub 25 of the reverse drive gear 11. By contrast, the input shaft 9 is connected with the primary shaft 13 by moving the sleeve 26 leftward in FIG. 6 to be engaged with both of the hub 24 of the input shaft 9 and the hub 30 of the primary shaft 13. The remaining structures are similar to those of the examples shown in FIGS. 1 and 4. Therefore, common reference numerals are allotted to the common elements in FIG. 6, and detailed explanations for those common elements are omitted.

As described, the example shown in FIG. 6 is different from the examples shown in FIGS. 1 and 4 in the positions of the second clutch device and C2 and the dog clutch 23, and in other alterations. Therefore, as the foregoing examples, the launching stage for establishing a large drive torque for propelling the vehicle in the forward direction, the continuously variable speed change stage using the continuously variable transmission 1, and the reverse stage can be achieved by engaging and disengaging the first clutch device C1, the second clutch device C2 and the dog clutch 23 as shown in FIG. 3.

Specifically, in case of launching the vehicle in the forward direction, the first clutch device C1 is engaged and the second clutch device C2 is disengaged. Consequently, the input shaft 9 is connected with the output shaft 15 through the drive gear 10, the first clutch device C1 and the driven gear 19 forming the starting transmission mechanism, and the reverse transmission mechanism and the continuously variable transmission 1 are disconnected from the input shaft 9 by the dog clutch 23 or the second clutch device C2. Therefore, the speed ratio larger than the maximum speed ratio of the continuously variable transmission 1 is established by the starting transmission mechanism to launch the vehicle by the drive force established in accordance with such a large speed ratio. In this situation, the gear stage can be shifted from the launching stage promptly to the reverse stage by disengaging the first clutch device C1 and engaging the second clutch device C2 while moving the sleeve 26 of the dog clutch 23 to the position "R" for establishing the reverse stage. Therefore, the shifting response under the garage shifting can be improved.

In addition, when launching the vehicle, the gear stage can be shifted promptly from the launching stage where the speed ratio is large to the continuously variable speed change stage where the speed ratio is varied continuously by the continuously variable transmission 1, by carrying out the clutch-to-clutch shifting to disengage the first clutch device C1 and to engage the second clutch device C2, while moving the sleeve 26 of the dog clutch 23 to the position "F" for propelling the vehicle in the forward direction. In this case, therefore, the response delay can also be avoided.

The advantages of the examples shown in FIGS. 1 and 4 may also be achieved by the fourth example shown in FIG. 6 thus structured. In the example shown in FIG. 6, the engagement state of the second clutch device C2 is altered when shifting the gear stage from the launching stage to the continuously variable speed change stage using the continuously variable transmission 1 or to the reverse stage. However, a speed difference between the output shaft 15 and the secondary shaft 29 or the reverse driven gear 22 is rather small at the point of shifting. Therefore, as the example shown in FIG. 1, a transient slip of the second clutch device C2 when altering the engagement state can be reduced so that the durability thereof can be improved.

Figure 7:
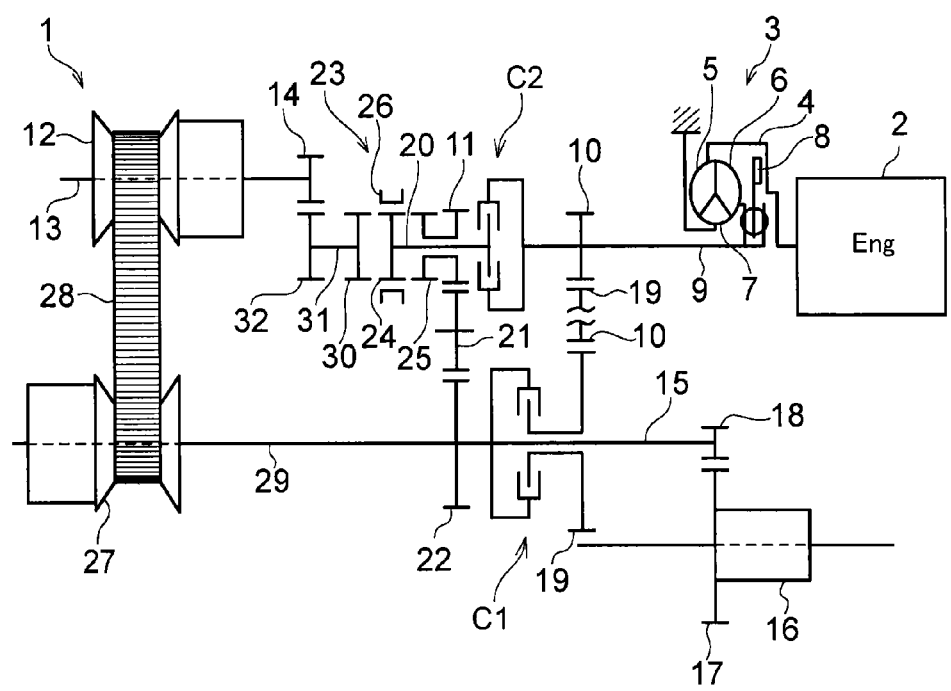
FIG. 7 is a skeleton diagram showing a fifth example of the power transmission unit for a vehicle according to the present invention.

FIG. 7 shows the fifth example as a modification of the first example shown in FIG. 1 in which the members disposed on the input shaft 9 side in the example shown in FIG. 1 are disposed on the output shaft 15 side, and the members disposed on the output shaft 15 side are disposed on the input shaft 9 side. In other words, the fifth example is a modification of the second example shown in FIG. 4 in which the first clutch device C1 is arranged coaxially with the output shaft 15. Accordingly, the drive gear 10 is fitted onto the input shaft 9 to be rotated integrally therewith. The driven gear 19 is fitted onto the output shaft 15 while being allowed to rotate, and the first clutch device C1 selectively connects and disconnects the driven gear 19 to/from the output shaft 15. The remaining structures are similar to those of the examples shown in FIGS. 1 and 4. Therefore, common reference numerals are allotted to the common elements in FIG. 7, and detailed explanations for those common elements are omitted.

In the power transmission unit shown in FIG. 7, the launching stage for establishing a large drive torque, the continuously variable speed change stage using the continuously variable transmission 1, and the reverse stage transmitting the drive torque through the reverse transmission mechanism can be achieved by engaging and disengaging the first clutch device C1, the second clutch device C2 and the dog clutch 23 as shown in FIG. 3. The torque transmitting routes and the torque transmitting conditions under those stages, and procedures for establishing those stages are identical to those of the foregoing examples, therefore, detailed explanations will be omitted. The advantages of the foregoing examples may also be achieved by the fourth example shown in FIG. 7 thus structured. In the example shown in FIG. 7, the dog clutch 23 is thus arranged in the input shaft 9 side. Therefore, the advantage of the example shown in FIG. 7 is that the torque multiplied as a result of speed change will not be applied to the dog clutch 23, as the examples shown in FIGS. 4 and 6. Therefore, the dog clutch 23 can also be downsized and the torque capacity thereof can also be reduced. In addition, since the second clutch device C2 is arranged in the input shaft 9 side, the torque multiplied to be larger than the torque from the input shaft 9 will not be applied to the second clutch device C2 as the examples shown in FIGS. 4 and 6. Therefore, the second clutch device C2 can be downsized and the torque capacity thereof can be reduced.

Figure 8:
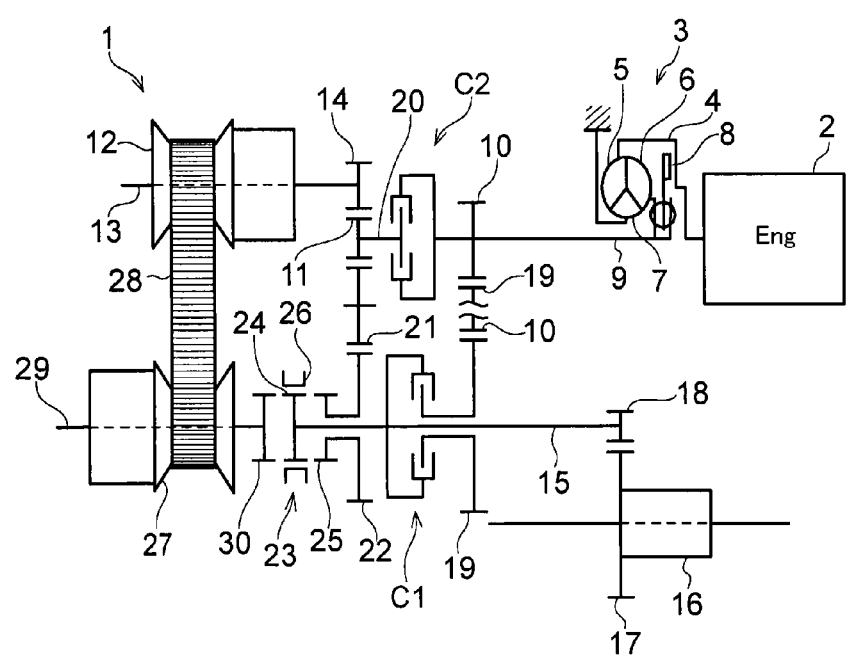
FIG. 8 is a skeleton diagram showing a sixth example of the power transmission unit for a vehicle according to the present invention.

FIG. 8 shows the sixth example as a modification of the fifth example shown in FIG. 7 in which the dog clutch 23 is disposed on the output shaft 15 side or the secondary shaft 39 side, and in which other necessary alterations are made. The remaining structures are similar to those of the example shown in FIG. 7. Therefore, common reference numerals are allotted to the common elements in FIG. 8, and detailed explanations for those common elements are omitted.

According to the power transmission unit shown in FIG. 8, the launching stage for propelling the vehicle in the forward direction, the continuously variable speed change stage using the continuously variable transmission 1, and the reverse stage for transmitting the drive torque through the reverse transmission mechanism can also be achieved by engaging and disengaging the first clutch device C1, the second clutch device C2 and the dog clutch 23 as shown in FIG. 3. According to the example shown in FIG. 8, although the torque multiplied as a result of speed change is applied to the dog clutch 23, a speed difference between both sides of the dog clutch 23 can be reduced. Therefore, the rotational speeds of both sides of the dog clutch 23 can be synchronized easily when engaging the dog clutch 23, as the examples shown in FIGS. 1, 5 and 7. In addition, since the reverse drive gear 11 (or the counter drive gear 32) is used for multiple purpose, number of parts of the power transmission unit can be reduced. Therefore, the structure of the power transmission unit can be simplified so that the power transmission unit itself can be downsized. That is, as the examples shown in FIGS. 1 and 5, the reverse drive gear 21 is meshed not only with the counter driven gear 14 to transmit torque from the input shaft 9 to the primary shaft 13 of the continuously variable transmission 1 through the intermediate shaft 20, but also with the reverse driven gear 22 to transmit torque from the input shaft 9 to the reverse transmission mechanism through the intermediate shaft 20. Therefore, the structure of the power transmission unit can be simplified so that the power transmission unit can be downsized.

According to the example shown in FIG. 8, the torque transmitting routes and the torque transmitting conditions under the above-mentioned stages, and procedures for establishing those stages are identical to those of the foregoing examples, therefore, detailed explanations will be omitted. The advantages of the foregoing examples may also be achieved by the sixth example shown in FIG. 8 thus structured.

Figure 9:
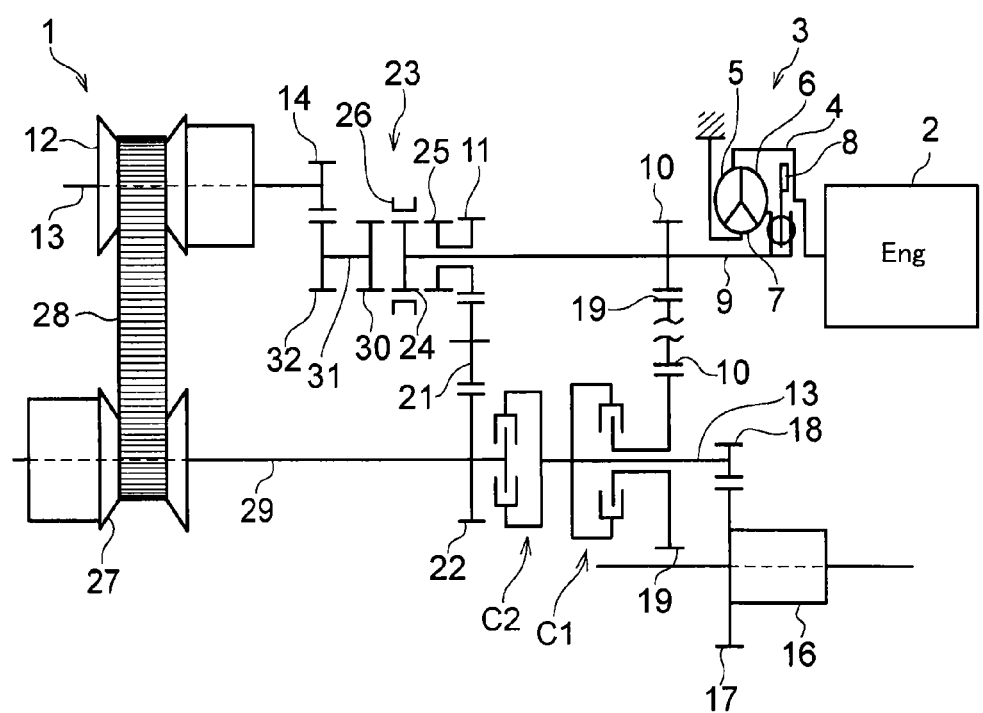
FIG. 9 is a skeleton diagram showing a seventh example of the power transmission unit for a vehicle according to the present invention.

FIG. 9 shows the seventh example as a modification of the first example shown in FIG. 1 in which the first clutch device C1 is disposed on the output shaft 15 side and the dog clutch 23 is disposed on the input shaft 9 side or the primary pulley 12 side, and in which other necessary alterations are made. In other words, the seventh example is a modification of the fourth example shown in FIG. 6 in which the first clutch device C1 is disposed on the output shaft 15 side, or a modification of the fifth example shown in FIG. 7 in which the second clutch device C2 is disposed on the output shaft 15 side. The remaining structures are similar to those of the examples shown in FIGS. 1, 6 and 7. Therefore, common reference numerals are allotted to the common elements in FIG. 9, and detailed explanations for those common elements are omitted.

According to the power transmission unit shown in FIG. 9, the launching stage for propelling the vehicle in the forward direction, the continuously variable speed change stage using the continuously variable transmission 1, and the reverse stage for transmitting the drive torque through the reverse transmission mechanism can also be achieved by engaging and disengaging the first clutch device C1, the second clutch device C2 and the dog clutch 23 as shown in FIG. 3. Also, the torque transmitting routes and the torque transmitting conditions under those stages, and procedures for establishing those stages are identical to those of the foregoing examples, therefore, detailed explanations will be omitted. Since the structure of the power transmission unit shown in FIG. 9 is similar to those of the examples 6 and 7, the advantages of the foregoing examples shown in FIGS. 6 and 7 may also be achieved by the seventh example shown in FIG. 9.

Figure 10:
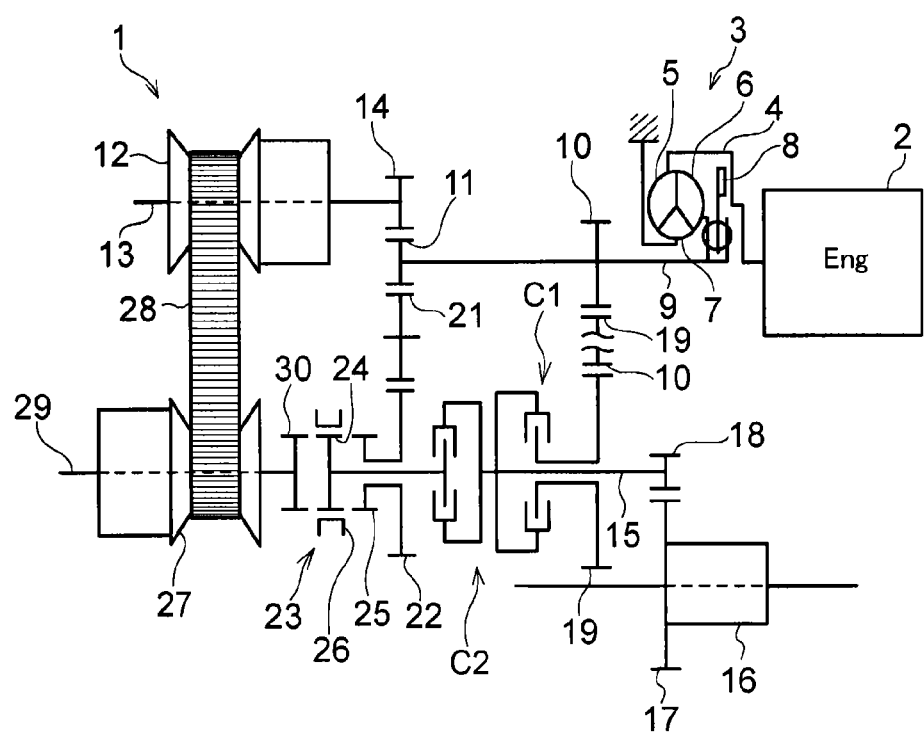
FIG. 10 is a skeleton diagram showing an eighth example of the power transmission unit for a vehicle according to the present invention.

FIG. 10 shows the eighth example as a modification of the first example shown in FIG. 1 in which the first clutch device C1 is disposed on the output shaft 15 side and the counter gear pair is disposed on the input shaft 9 side or the primary pulley 12 side, and in which other necessary alterations are made. In other words, the eighth example is a modification of the fifth example shown in FIG. 7 in which the first clutch device C1 and the dog clutch 23 are disposed on the output shaft 15 side, or a modification of the sixth example shown in FIG. 8 in which the second clutch device C2 is disposed on the output shaft 15 side. The remaining structures are similar to those of the examples shown in FIGS. 1, 7 and 8. Therefore, common reference numerals are allotted to the common elements in FIG. 10, and detailed explanations for those common elements are omitted.

According to the power transmission unit shown in FIG. 10, the launching stage for propelling the vehicle in the forward direction, the continuously variable speed change stage using the continuously variable transmission 1, and the reverse stage for transmitting the drive torque through the reverse transmission mechanism can also be achieved by engaging and disengaging the first clutch device C1, the second clutch device C2 and the dog clutch 23 as shown in FIG. 3. Also, the torque transmitting routes and the torque transmitting conditions under those stages, and procedures for establishing those stages are identical to those of the foregoing examples, therefore, detailed explanations will be omitted. Since the structure of the power transmission unit shown in FIG. 10 is similar to those of the examples 6 and 7, the advantages of the foregoing examples shown in FIGS. 6 and 7 may also be achieved by the eighth example shown in FIG. 10.

For example, since the reverse drive gear 11 (or the counter drive gear 32) is used for multiple purpose, number of parts of the power transmission unit can be reduced. Therefore, the structure of the power transmission unit can be simplified so that the power transmission unit itself can be downsized. That is, as the examples shown in FIGS. 1, 5 and 8, the reverse drive gear 21 is meshed not only with the counter driven gear 14 to transmit torque from the input shaft 9 to the primary shaft 13 of the continuously variable transmission 1 through the intermediate shaft 20, but also with the reverse driven gear 22 to transmit torque from the input shaft 9 to the reverse transmission mechanism through the intermediate shaft 20. Therefore, the structure of the power transmission unit can be simplified so that the power transmission unit can be downsized.

Thus, in the power transmission unit of the present invention, the torque transmission route from the input shaft 9 to the output shaft 15 can be selected from: the route passing through the first gear train comprised of the drive gear 10 and the driven gear 19 (i.e., the starting transmission mechanism); the route passing through the second gear train comprised of the reverse drive gear 11, the idle gear 21 and the reverse driven gear 22 (i.e., the reverse transmission mechanism); and the route passing through the continuously variable transmission 1 (i.e., the continuously variable speed change route). In order to switch the torque transmission route, only three engagement devices such as the first clutch device C1, the second clutch device C2 and the dog clutch 23 are employed. That is, although the torque transmission route can be selected from multiple options, number of the required engagement devices is rather small. According to the present invention, therefore, a structure of the power transmission unit can be simplified so that the power transmission unit can be downsized.

According to the power transmission unit of the present invention, especially, the route for transmitting torque through the continuously variable speed change route and the route for transmitting torque through the reverse route to propel the vehicle backwardly can be switched by the common dog clutch. Therefore, the structure of the power transmission unit can be simplified so that the power transmission unit can be downsized.

Moreover, according to the present invention, the starting transmission mechanism is adapted to establish a speed ratio larger than the maximum speed ratio of the continuously variable transmission 1 or a speed ratio smaller than the minimum speed ratio of the continuously variable transmission 1. Therefore, a possible range of the speed ratio of the power transmission unit can be widened.

Further, according to the present invention, the first clutch device C1, the second clutch device C2 and the dog clutch 23 are individually formed of a single clutch. Therefore, the power transmission unit can be further downsized. For example, a friction clutch may be used as the first clutch device C1, the second clutch device C2 and the dog clutch 23. In this case, the clutch-to-clutch shifting can be carried out to improve a control response of the shifting operation such as a garage shifting. In addition, shift shocks can be reduced.

As described, according to the present invention, the dog clutch 23 may also be disposed on the output shaft 15 side. In this case, the counter gear pair for transmitting torque from the input shaft 9 to the continuously variable transmission route is allowed to share a common drive gear with the counter gear pair for transmitting torque from the input shaft 9 to the reverse route. To this end, specifically, the reverse drive gear 21 is meshed with the counter driven gear 14 to transmit torque between the input shaft 9 and the primary shaft 13 of the continuously variable transmission 1, as well as with the reverse driven gear 22 to transmit torque between the input shaft 9 and the reverse transmission mechanism. Thus, the gear train forming the continuously variable transmission route and the reverse route are allowed to share the common gear. Therefore, the structure of the power transmission unit can be further simplified so that the power transmission unit can be further downsized.

In the foregoing examples, the speed ratio of the first gear train between the drive gear 10 and the driven gear 19 are increased to be larger than the maximum speed ratio of the continuously variable transmission 1. That is, the present invention is applied to establish a speed ratio which cannot be established by the continuously variable transmission 1 using the gear train. Therefore, a speed ratio smaller than the minimum speed ratio of the continuously variable transmission 1 may also be established using the first gear train. In this case, when the vehicle is propelled by running the engine under the low load condition, the engine speed can be reduced to be lower than the speed reduced by continuously variable transmission 1. For this reason, the fuel economy can be further improved. In addition, the first gear train may also be adapted to establish a plurality of different ratios.

The invention claimed is:

1. A power transmission unit for a vehicle, comprising:
a continuously variable transmission that is adapted to alter a speed ratio continuously, and that is disposed between an input shaft to which a torque of a prime mover is inputted and an output shaft that outputs the torque;
a first gear train that transmits the torque when propelling the vehicle in the forward direction; and
a second gear train that transmits the torque to propel the vehicle backwardly by rotating the output shaft in an opposite direction to a rotational direction of the input shaft when propelling the vehicle in the backward direction and that is arranged parallel to the first gear train;
a first clutch device that selectively allows a torque transmitting route from the input shaft to the output shaft via the first gear train to transmit the torque therethrough;
a dog clutch that switches the torque transmitting route from the input shaft to the output shaft between a continuously variable speed change route in which the torque is transmitted through the continuously variable transmission and a reverse route in which the torque is transmitted through the second gear train;
a second clutch device that selectively enables and disables both of the continuously variable speed change route and the reverse route to transmit the torque to the input shaft or the output shaft; and
a counter gear pair that is disposed at a site to transmit the torque of the input shaft to the continuously variable transmission route and to the reverse route, and that is involved in a torque transmission between the input shaft and the continuously variable transmission route and a torque transmission between the input shaft and the reverse route.

2. The power transmission unit for a vehicle as claimed in claim 1,
wherein the first gear train is adapted to establish a speed ratio larger than a maximum speed ratio of the continuously variable transmission or a speed ratio smaller than a minimum speed ratio of the continuously variable transmission using a plurality of gears.

3. The power transmission unit for a vehicle as claimed in claim 1, wherein the dog clutch is adapted to:
enable a torque transmission through the continuously variable speed change route by engaging a movable member that is engaged with an input member for the continuously variable speed change route and the reverse route or with an output member for the reverse route, with a member forming a part of the continuously variable speed change route, and
enable a torque transmission through the reverse route by engaging the movable member with a member forming a part of the reverse route.

4. The power transmission unit for a vehicle as claimed in claim 1,
wherein each of the first clutch device and the second clutch device is individually formed by a single clutch.

5. The power transmission unit for a vehicle as claimed in claim 1,
wherein each of the first clutch device and the second clutch device is individually formed by a fiction clutch.

6. The power transmission unit for a vehicle as claimed in claim 1,
wherein the dog clutch is disposed at a site to transmit the torque to the output shaft while switching the torque transmission route between the continuously variable speed change route and the reverse route; and
wherein a drive gear of the counter gear pair is arranged coaxially with the input shaft so as to commonly serve as one of gears of a gear pair transmitting torque between the input shaft and the continuously variable speed change route, and one of gears of another gear pair transmitting torque between the input shaft and the reverse route.

7. The power transmission unit for a vehicle as claimed in claim 1,
wherein the first clutch device is disposed between the input shaft and the first gear train; and
wherein the first gear train is connected to the output shaft.

8. The power transmission unit for a vehicle as claimed in claim 1,
wherein the first clutch device is disposed between the output shaft and the first gear train; and
wherein the first gear train is connected to the input shaft.

9. The power transmission unit for a vehicle as claimed in claim 1,
wherein the second clutch device is disposed at a site to transmit the torque of the input shaft to the continuously variable speed change route and to the reverse route.

10. The power transmission unit for a vehicle as claimed in claim 1,
wherein the second clutch device is disposed at a site to transmit the torque from the continuously variable speed change route and the reverse route to the output shaft.

11. The power transmission unit for a vehicle as claimed in claim 1,
wherein the dog clutch is disposed at a site to transmit the torque of the input shaft selectively to the continuously variable speed change route and to the reverse route.

* * * * *